(12) United States Patent
Torrance et al.

(10) Patent No.: US 7,954,518 B2
(45) Date of Patent: Jun. 7, 2011

(54) TEAR CORD FOR JACKETED TUBE

(76) Inventors: Roy Torrance, Houston, TX (US); Jody James, Pearland, TX (US)

( * ) Notice: Subject to any disclaimer, the term of this patent is extended or adjusted under 35 U.S.C. 154(b) by 157 days.

(21) Appl. No.: 12/250,016

(22) Filed: Oct. 13, 2008

(65) Prior Publication Data

US 2010/0018711 A1    Jan. 28, 2010

Related U.S. Application Data

(63) Continuation-in-part of application No. 12/178,246, filed on Jul. 23, 2008, now Pat. No. 7,581,565.

(51) Int. Cl.
*F16L 11/00* (2006.01)

(52) U.S. Cl. ........ 138/110; 138/149; 138/139; 138/131; 138/127; 174/102 R

(58) Field of Classification Search ................... 138/149; 385/108, 109, 110, 112; 174/102 R, 36
See application file for complete search history.

(56) References Cited

U.S. PATENT DOCUMENTS

| | | | |
|---|---|---|---|
| 3,748,371 A | 7/1973 | Krook et al. | |
| 4,041,237 A | 8/1977 | Stine et al. | |
| 4,096,346 A | 6/1978 | Stine et al. | |
| 4,237,337 A | 12/1980 | Serrander | |
| 4,707,074 A | 11/1987 | Heywood | |
| 4,893,893 A | 1/1990 | Claxton et al. | |
| 5,469,523 A | 11/1995 | Blew et al. | |
| 5,481,068 A | 1/1996 | Norden | |
| 5,542,020 A * | 7/1996 | Horska ......................... 385/112 |
| 5,574,816 A | 11/1996 | Yang et al. | |
| 5,651,081 A | 7/1997 | Blew et al. | |
| 5,962,945 A | 10/1999 | Krenzer et al. | |
| 6,052,502 A * | 4/2000 | Coleman ....................... 385/114 |
| 6,088,499 A * | 7/2000 | Newton et al. ................ 385/112 |
| 6,236,790 B1 * | 5/2001 | Okada et al. .................. 385/102 |
| 6,249,629 B1 * | 6/2001 | Bringuier ...................... 385/113 |
| 6,441,308 B1 | 8/2002 | Dagnon | |
| 6,500,541 B1 | 12/2002 | Schoeck | |
| 6,541,706 B2 | 4/2003 | McLeon | |
| 6,813,421 B2 * | 11/2004 | Lail et al. ...................... 385/101 |
| 7,276,664 B2 | 10/2007 | Gagnon | |
| 7,346,257 B2 * | 3/2008 | Mumm et al. ................ 385/141 |
| 2003/0178222 A1 * | 9/2003 | Moore et al. .............. 174/120 R |
| 2004/0245010 A1 | 12/2004 | Bankes et al. | |

FOREIGN PATENT DOCUMENTS

WO    PCT/US09/03634    1/2010

* cited by examiner

*Primary Examiner* — Patrick F Brinson
(74) *Attorney, Agent, or Firm* — David McEwing

(57) ABSTRACT

The disclosure pertains to installing a plurality of tear cords between a metal tube and a protective jacket. The multiple cords facilitate ease of removal of the protective jacket by creating a panel of the jacket that is detached from the remainder by pulling on the multiple tear cords. The resulting widened space can be used to remove the tube from the remaining protective jacket. The jacketed tubes may be used in a hydrocarbon production downhole well bore. The tubes may be used to furnish hydraulic fluid or chemicals into the well bore. The contents may be pressurized or under vacuum. The jacketed tubes are hermetically sealed. The tubes, which may be 1 inch in diameter, are joined using compression fittings. Tear cords are used to facilitate removal of the protective jacket without damage to the tube surface thereby facilitating the placement of compression fittings and maintaining the integrity of the tube wall.

17 Claims, 6 Drawing Sheets

TEAR CORD FOR JACKETED TUBE

RELATED APPLICATION

This application is a continuation in part of application Ser. No. 12/178,246 entitled "Tear Cord for Jacketed Tube" filed Jul. 23, 2008 now U.S. Pat. No. 7,581,565 and which is incorporated by reference herein.

BACKGROUND TO THE DISCLOSURE

1. Field of Use

The disclosure pertains to tubes used in hydrocarbon production down hole environments.

2. Related Art

Tear cords incorporated with electrical wires and fiber optic cables are known. See for example U.S. Pat. No. 5,469,523.

SUMMARY OF DISCLOSURE

The disclosure pertains to installing two or more tear cords between a solid wall metal tube (hereinafter "tube") and a surrounding protective jacket. The jacketed tubes may be used in a hydrocarbon production downhole well bore or in gas or water injector downhole well bores.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF DISCLOSURE

The disclosure pertains to a tear cord used to conveniently and safely remove a protective jacket surrounding a solid wall metal tube. The combined jacket and tube may be used in downhole applications related to the production of hydrocarbons. This includes gas or water injector downhole well bores.

Figure 1:
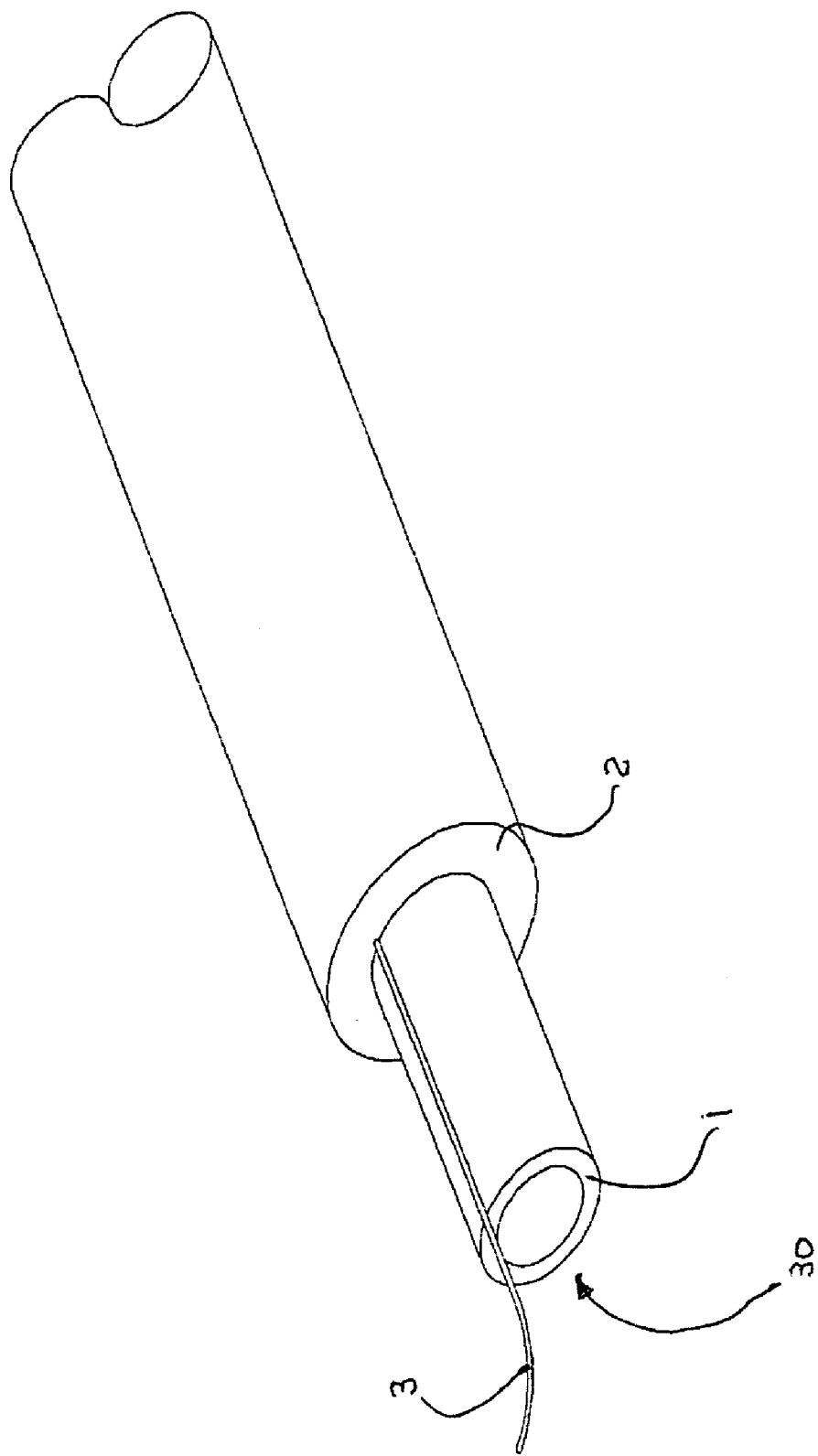
FIG. 1 illustrates a single tube with a protective jacket and tear cord.

Referencing FIG. 1, the tubes 1 are jacketed in one or more layers 2 of hard thermoplastic rubber or similar toughened and inert material to protect the tube and contents from the heat and corrosive environment of a well bore. The jacket also provides protection during installation and other events that may occur during operation of the well. The tubing may be placed inside the well casing and outside the production pipe. The jacketed tubes may be spoolable.

The protective jackets are difficult and dangerous to cut or slit with a knife blade. This can also result in the outer tube sealing surface being nicked or gouged. Other methods use specialized tools such as an Encapsulation Stripping Tool manufactured by Tube Tec of Stonehaven, UK. The tool comprises rotating knife blades enclosed within a housing. The blades are mechanically controlled to not contact the metal tube. The tool may be manually operated or powered with air. Another tool for removing encapsulating protective jackets is manufactured by AnTech of Exeter, UK. Both Tube Tec and AnTech supply tools with stands and hand cranks and are promoted as reducing injury to the operator stripping the encapsulation jacket.

The tube may comprise steel alloys such as but not limited to stainless steel, incoloy (an alloy comprising nickel-iron-chromium), duplex alloy, carbon steel, or galvanized carbon steel.

The tubing may vary in diameter from ⅛ inch to in excess of 1 inch. The tube wall thickness may be between 0.016 inch (or smaller) to 0.083 inch. The tubing walls are smooth and solid. The tubing has an annular or duct-like structure 30 as illustrated in FIG. 1.

The tubing may be used to convey chemicals and hydraulic fluids. Examples of chemicals conveyed through the tubing include water based glycol mixture during the initial drilling phase. During the well production phase, hydrates and asphaltines are pumped to reduce paraffin build up. Other chemicals include low dosage hydrate inhibitors, methanol ethylene glycol, ethanol and propanol.

The contents of the tubing may be under pressure or vacuum. The tubing may also contain an electrical power, electronic data transmission or fiber optic lines.

The sealing surface of the tubing is of prime importance, i.e., the wall of the tubing is to be free from nicks and gouges. This type of damage can result from use of a knife or other sharp edge instrument to cut away the protective jacket. In addition, this work is frequently performed on the floor of a drill rig. There are stringent safety standards imposed in this work environment making use of a knife or other open blade tools problematic.

The tube wall may also be pinched, kinked or misshaped in forcing the tube through the narrow slit created in the protective jacket by use of a single tear cord. The outer surface of the tube is required to be free from nicks and gouges since the tube connections can be made using compression fittings. If a nick or gouge extends into the surface deeper than the compression achieved by the ferrule of the compression fitting, a leak pathway is created. Such a defect may result in the fitting being over tightened, resulting in further deformation of the tubing. For example, the tubing may pass through an equipment housing. The connection of the tubing with the housing will utilize a compression fitting. Deformation of the tubing surface, including deformation occurring in the removal of the tubing from the slitted protective jacket, may compromise the seal of the compression fitting intended to block fluids or contaminants from entering the housing even if the tubing wall is not breached.

Gouges and nicks may also penetrate the tube wall. For example, if the tube is conveying hydraulic fluid, there will be a pressure loss. If the tubing is conveying chemicals, there will be likely contamination of the product or well completion fluid.

In some applications, the encapsulating protective jacket needs to be cut away from the tubing metal surface to allow a connection to be made in the tubing. The tubing will be required to be hermetically sealed and requires the insertion of ferrules or sleeves as part of the mechanical connection hardware in direct contact with the metal tube surface. Therefore the integrity of the tubing diameter and good uniform sealing surface is important in making a hermetically sealed connection. It is important that the tube not be deformed.

The proper handling and use of correct tools to remove the encapsulating jacket are important. Typically 6 to 12 inches of the jacket may be removed. However, on occasion, significantly greater lengths are removed, e.g., lengths in excess of 100 feet.

The encapsulating protective jacket may comprise polyamide (nylon) polyethylene, polypropylene, ethylene chlorotrifluoroerthlyene (Halar), engineering thermoplastic vulcanates (ETPV) or a thermoplastic elastomer cross linking ethylene propylene diene monomer rubber and polypropylene (Santoprene). It may also comprise perfluoroalkoxy (Teflon PFA), polyvinylidene fluoride (PVDF) or fluorinated ethylene propylene (Teflon FEP) Polyetheretherketone (PEEK), or similar material. These are stiff and relatively non-compliant materials. It can be very difficult to separate the tube from the slitted protective jacket.

For these and other reasons, this disclosure teaches use of two tear cords placed between the tube and the protective jacket. This allows the worker to pull back the tear cords and thereby create two slits in the jacket. The portion of the protective jacket between the slits can be easily pulled away, leaving a broad opening for separating the tube from the remaining jacket. The worker can manually pull away the jacket. The jacket material that has been pulled off can be cut off using scissors, side cutter pliers, or other tools not containing an open blade.

Some tubing may be protected in an individual jacket and a group of such tubes then encased into a single outer jacket. This group may comprise 2 to 5 individual tubes. The group of tubes may be protected by multiple jackets. The tubes may be of differing diameter. This outer jacket may be flat, i.e., the tubes are stacked one on top of the other, thereby minimizing the width that will be taken up in a well bore. (See for example FIG. 3.) Special tooling may be installed with the well casing or on the outer surface of the production tubing to create channels or pathways holding the tubing cable.

Referencing FIG. 1, the disclosure teaches placing a tear cord 3 adjacent to the tube 1 under the protective jacket 2. Referencing FIG. 3, in one embodiment at least one tear cord 13, 14, 15 is placed between the outer flat jacket 12 and each individual tube 9, 10, 11.

Figure 4:
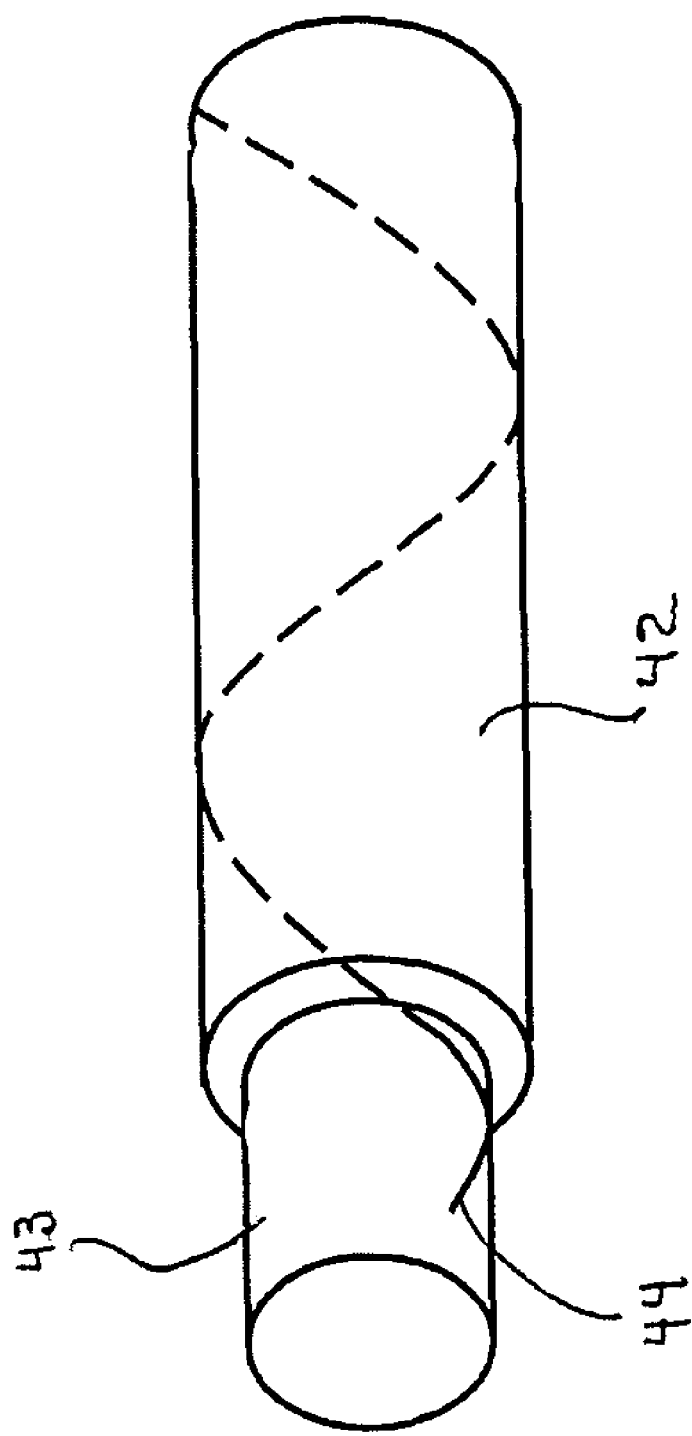
FIG. 4 illustrates a tear cord helically wound on a tube.

The tear cord (sometimes referred to as a rip cord), can be oriented along longitudinal axis of the tube or wound in a helical pattern around the tube. This helical winding pattern is illustrated in FIG. 4 and may be particularly useful for cable consisting of a single tube with a protective jacket. FIG. 4 illustrates the encapsulating protective jacket 42 surrounding the tube 43 and the tear cord 44 between the tube and the jacket. The helical pattern facilitates removal of the jacket. The angled slit created in the jacket provides an edge that can easily be pulled from the end around and away from the tubing.

The tear cord can be a metal wire or other strong material such as Kevlar, a poly-aramid synthetic fiber. A Kevlar fiber is advantageous since the multiple fiber strands compress flat against the tubing or inner jacket, thereby not distorting the circumference of the outer jacket.

An advantage of a metal wire used as a tear cord is that the wire can be heated, thereby softening the jacket material to facilitate tearing the wire through the softened jacket. It will be appreciated that the jacket material needs to plasticize so that it can be sheared with the wire at a temperature below the melting point of the metal wire. This method may advantageously use an inner jacket to shield the tubing from heat.

In another embodiment, the tear cord (or cords) is installed between the tube(s) and the protective jacket in selected locations in contrast to continuously along the length of the cable. This saves the cost and weight of materials that are not needed. For example, a tear cord may be installed in the first 100 feet and last 100 feet of a length of cable installed in between the well casing and the production tubing. The manufacturing process could mark the outside of the protective jacket to indicate the presence of a tear cord. This could be as simple as a painted line.

The use of hermetically sealing compression fittings allows the interior of the tube to maintain a positive atmosphere and thereby retard the infiltration of contaminants or fluid. Such contaminants or fluid may interfere with the signal or conductivity of a fiber optic or electrical wire.

FIG. 1 illustrates a single tube 1 with a protective jacket. The jacket 2 is illustrated. Also illustrated is the tear cord 3 which is installed between the jacket and the tube.

Figure 2:
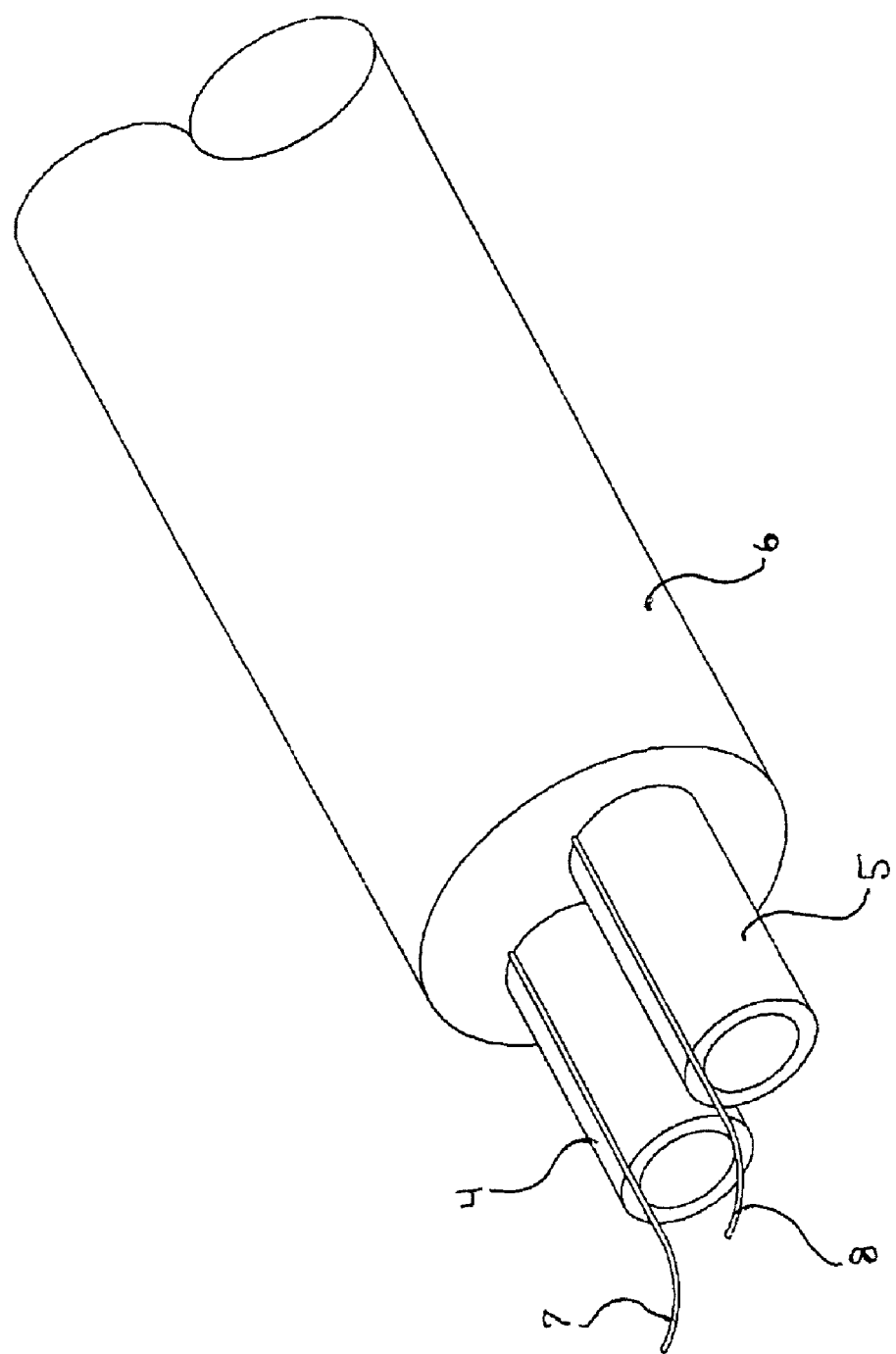
FIG. 2 illustrates two tubes within a protective jacket.

FIG. 2 illustrates a pair of tubes 4, 5 encased by a single jacket 6. There are two tear cords 7, 8. Each tear cord is associated with a single tube.

Figure 3:
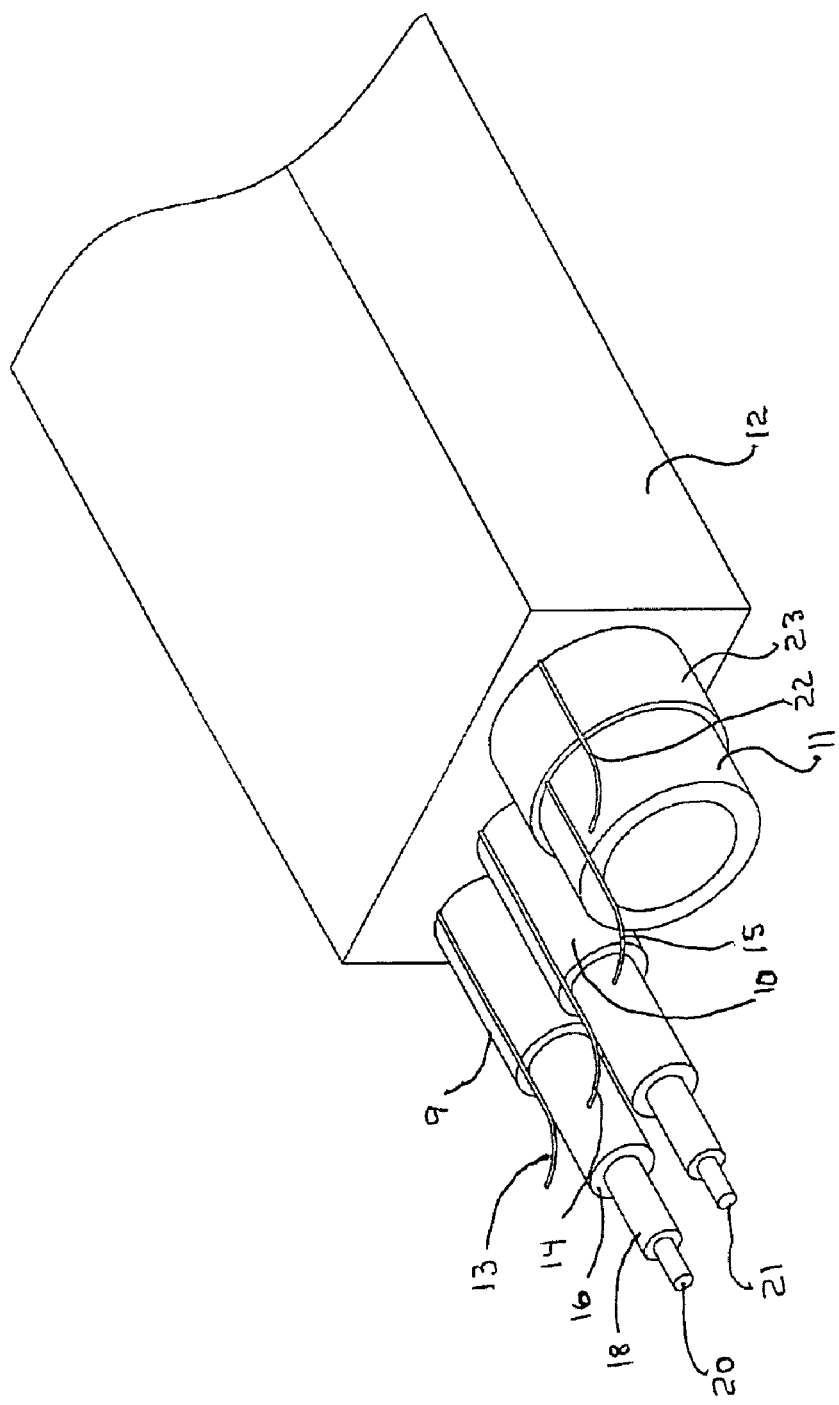
FIG. 3 illustrates 3 tubes of two separate diameters. The two smaller diameter tubes have two separate jackets over an inner wire or fiber.

FIG. 3 illustrates a 3 tube flat pack. The tubes 9, 10, 11, are encased in a rectangular jacket 12. There are individual tear cords 13, 14, 15 installed between each tube 9, 10, 11 and the surrounding jacket 12. One tube 11 is protected by two separate jackets 12, 23. In this embodiment, separate tear cords 15, 22 are installed for each jacket layer.

Continuing with FIG. 3, the inner coverings within the smaller diameter tubes 9, 10 can provide mechanical support 16 and the innermost layer providing electrical insulation 18 for the wire or fiber optic cable 20, 21. These additional layers may be, for example, foam, or polyethylene or polypropylene. As indicated, the inner fiber may be a fiber optic cable or it may be a wire carrying electrical power or a data transmission line.

FIG. 4 illustrates a single tube 43 with a tear cord 44 wound helically beneath a protective jacket 42. It will be appreciated that the helically wound embodiment would work with other tube and jacketing configurations, including the double tube configuration illustrated in FIG. 2 and the triple tube configuration of FIG. 3.

Figure 5:
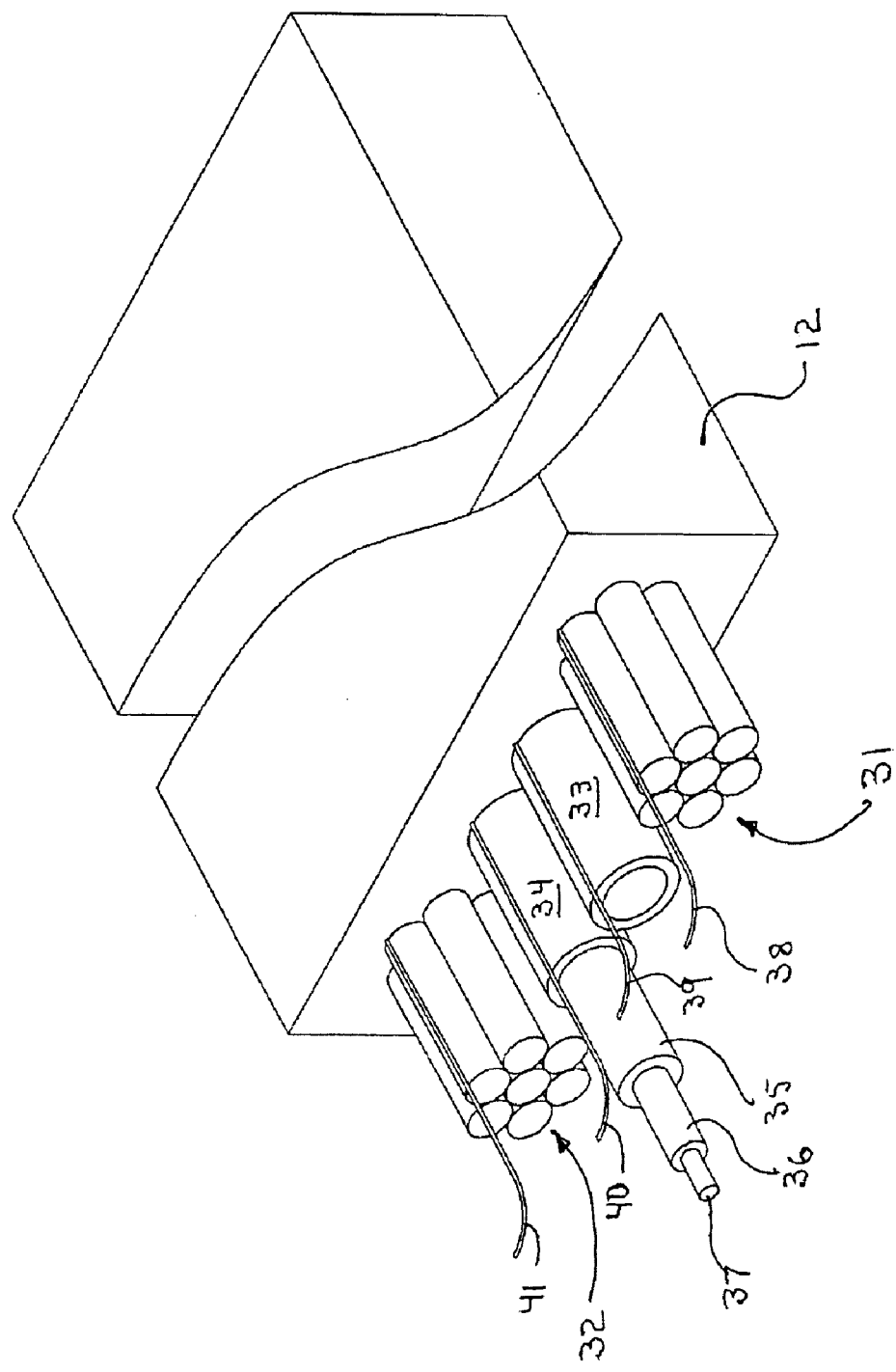
FIG. 5 illustrates a cable comprising twisted steel bumpers or strand protecting a jacketed tube with tear cords.

FIG. 5 illustrates 2 jacketed tubes 33, 34 combined with two strands of steel rope or strand 31, 32. The steel rope may be dimensioned to provide protection to the tube against crushing forces as well as weight support of the tube in a vertical downhole environment. Also illustrated are tear cords 38, 39, 40, 41 installed adjacent to the tube and to each steel rope. Also illustrated is one tube 34 containing a wire or fiber optic cable surrounded by insulation 36 and structural support 35. It will be appreciated that both layers, installed inside the tube, may act as insulators.

Figure 6:
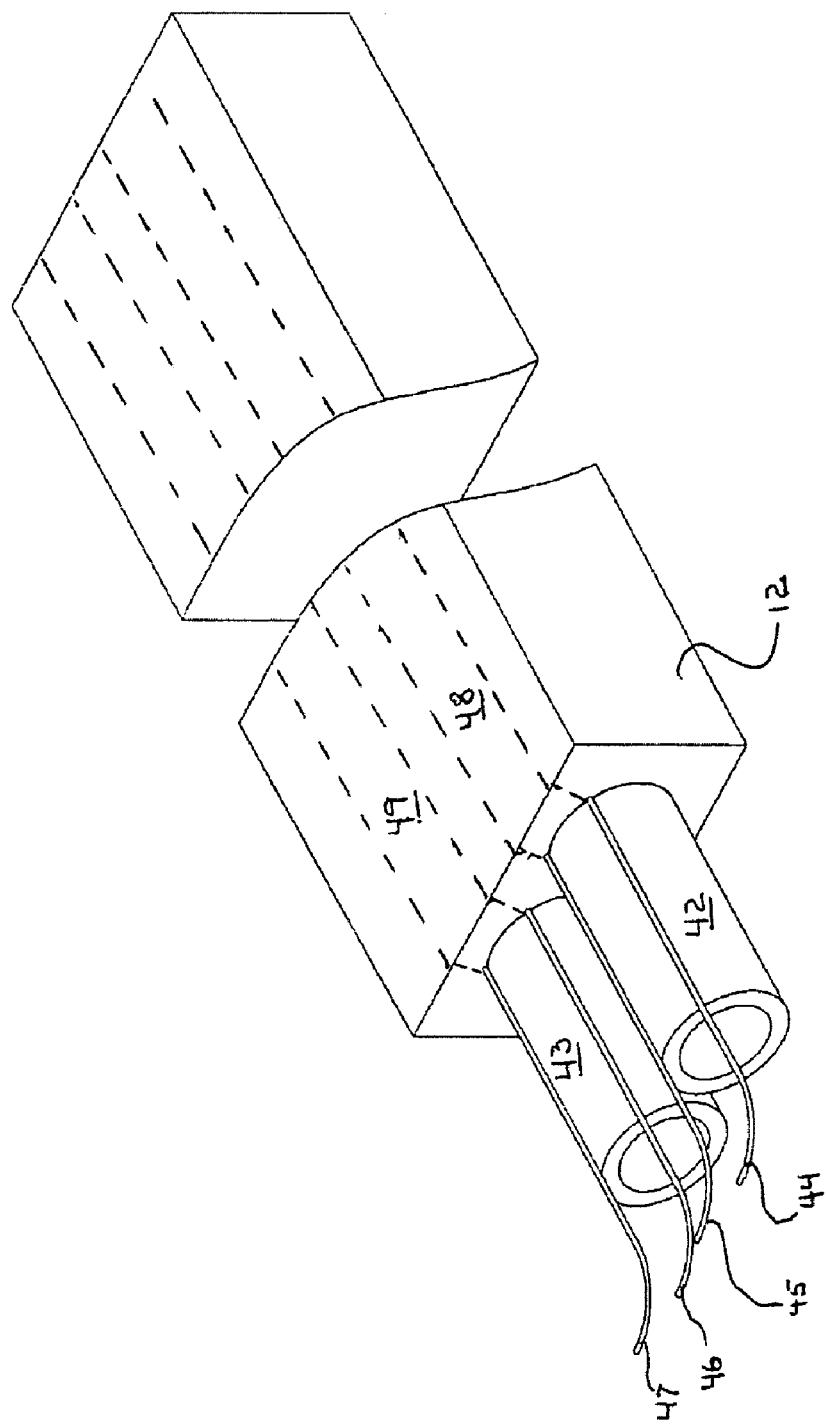
FIG. 6 illustrates a cable comprising two tubes each containing two separately located tear cords between the outer surface of each tube and the inner surface of the protective jacket.

FIG. 6 illustrates a preferred embodiment of the disclosure. Illustrated are two tubes 42, 43 and a protective jacket 12. The illustrated cable also comprises two pairs of tear cords 44 & 45, 46 & 47. Each pair is for a separate tube 42, 43. Pulling of tear cords 44 & 45 will remove a panel or strip 48 of the protective jacket. Pulling of tear cord 46 & 47 will remove a panel or strip 49 of the protective jacket. Removal of this relatively wide strip facilitates separation of the tube from the jacket. This is in contrast to the slit described as the product utilizing a single tear cord. The broader opening or removal of a panel of the protective jacket allows the protective jacket to be more easily removed and without risk of damage to the tube or deformation of the tube.

In addition, this specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

The invention claimed is:

1. A metal tube comprising a first outer encapsulating protective jacket around an inner solid smooth wall hermetically sealable metal tube and multiple tear cords between the said jacket and the said tube.

2. The tube of claim 1 wherein the tube conveys hydraulic fluid.

3. The tube of claim 1 wherein the tube conveys chemicals.

4. The tube of claim 1 wherein the jacket comprises polyamide, polyethylene, ethylene chlorotrifluoroerthlyene or a thermoplastic elastomer cross linking ethylene propylene diene monomer rubber and polypropylene.

5. The tube of claim 1 wherein the jacket comprises engineered thermoplastic vulcanates, perfluoroalkoxy, polyvinylidene fluoride or fluorinated ethylene propylene.

6. The tube of claim 1 further comprising tear cords made of poly-aramid fiber.

7. The tube of claim 1 wherein the tube further comprises incoloy, stainless steel, carbon steel, or galvanized carbon steel.

8. The tube of claim 1 further comprising a second inner jacket beneath the first jacket and surrounding the tube.

9. The tube of claim 1 further comprising multiple tear cords made of metal.

10. The tube of claim 1 wherein the multiple tear cords are helically wound around the tube or an inner jacket surrounding the tube.

11. The tube of claim 1 further comprising multiple tear cords placed at selected locations on the length of the tube.

12. The tube of claim 1 further comprising one or more proximate steel ropes each with a tear cord wherein the rope has the same axis of orientation as the tube.

13. The tube of claim 1 further comprising a jacket of one or more of a group consisting of polyethylene, ethylene chlorotrifluoroerthlyene, a thermoplastic elastomer cross linking ethylene propylene diene monomer rubber and polypropylene, perfluoroalkoxy, polyvinylidene fluoride and fluorinated ethylene propylene.

14. A cable comprising a plurality of solid smooth wall metal pressure tubes, a plurality of tear cords for each of the solid wall metal tubes, and a jacket whereby the plurality of tear cords for each solid wall metal pressure tube lie along the axial length of each solid wall metal pressure tube between the said tube and the jacket wherein pulling of the plurality of tear cords removes a strip of the jacket.

15. The cable of claim 14 further comprising at least one tube containing a fiber optic cable, electrical wire or data communication cable.

16. The cable of claim 15 further comprising at least one tube conveying hydraulic fluid.

17. The cable of claim 15 further comprising at least one tube conveying chemicals.

* * * * *